(12) United States Patent
Foster-Hamilton et al.

(10) Patent No.: US 7,281,984 B2
(45) Date of Patent: Oct. 16, 2007

(54) BOOT WITH ARTICULATING AND PLUNGING CONVOLUTES

(75) Inventors: Pauline Maria Foster-Hamilton, Birmingham (GB); Toshitaka Asai, Waterford, MI (US); Noel W. Sutton, Auburn Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/812,449

(22) Filed: Mar. 29, 2004

(65) Prior Publication Data
US 2005/0215330 A1 Sep. 29, 2005

(51) Int. Cl.
*F16D 3/84* (2006.01)
(52) U.S. Cl. .................. 464/175; 403/50; 277/634; 464/162
(58) Field of Classification Search ............. 464/173, 464/175, 162, 167; 403/50, 51; 277/634–636
See application file for complete search history.

(56) References Cited

U.S. PATENT DOCUMENTS

| 2,702,996 | A | * | 3/1955 | Edward | 464/175 |
| 3,442,096 | A | * | 5/1969 | Orain | 464/175 |
| 4,878,389 | A | * | 11/1989 | Boge | 277/636 |
| 5,236,394 | A | * | 8/1993 | Collins et al. | 464/175 |
| 5,419,741 | A | * | 5/1995 | Schwarzler | 464/175 |
| 5,931,738 | A | * | 8/1999 | Robb | 277/636 |
| 6,585,601 | B2 | * | 7/2003 | Booker et al. | 464/146 |
| 6,585,602 | B2 | * | 7/2003 | Cermak et al. | 464/167 |

* cited by examiner

*Primary Examiner*—Aaron Dunwoody
(74) *Attorney, Agent, or Firm*—Jennifer M. Brumbaugh; Mick A. Nylander

(57) ABSTRACT

An improved boot for use in sealing a constant velocity joint and ball spline joint assembly includes a plurality of articulating convolutes, a grease catching member, and a first stabilizing member adapted to ride above an inner race of the ball spline joint to join the plurality of articulating convolutes and the grease catching member and provide stability at high speed. The boot further includes a plurality of plunging convolutes and a second stabilizing member adapted to ride above an outer race of the ball spline joint to join the plurality of plunging convolutes and the grease catching member and provide additional stability.

13 Claims, 9 Drawing Sheets

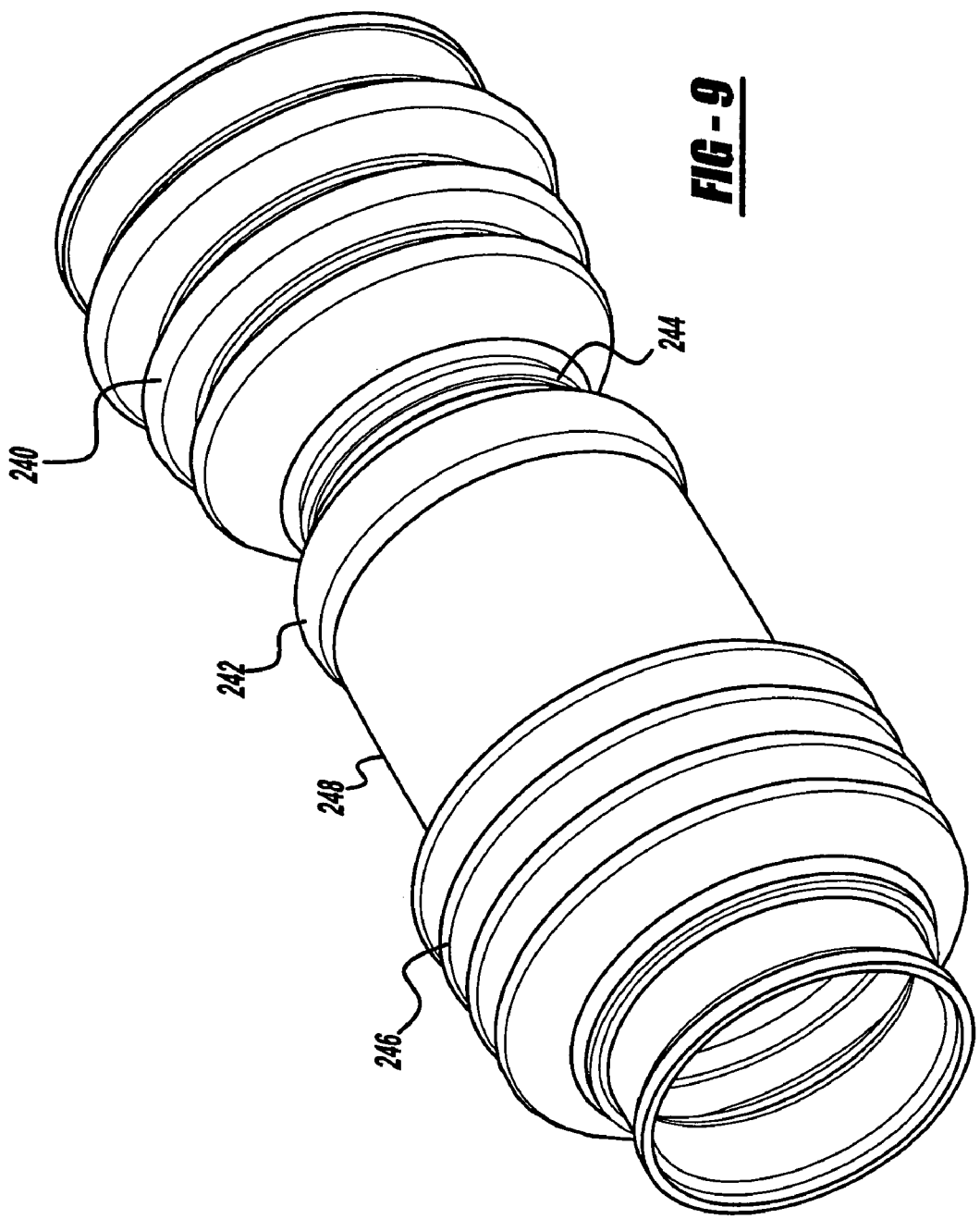

BOOT WITH ARTICULATING AND PLUNGING CONVOLUTES

TECHNICAL FIELD

The present invention relates to vehicle driveline assemblies in general, and more particularly, to an improved boot for use in sealing and stabilizing a fixed joint/ball spline joint assembly.

BACKGROUND ART

There are generally four (4) main types of automotive drive line systems. More specifically, there exists a full-time front wheel drive system, a full-time rear wheel drive system, a part-time four wheel drive system, and an all-wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respectively driven wheels to rotate at different speeds. For example, the outside wheels must rotate faster than the inside drive wheels, and the front drive wheels must normally rotate faster than the rear wheels.

Drive line systems also include one or more Cardan (Universal) and Constant Velocity joints (CVJ's). Cardan joints are the most basic and common joint type used, for example, on propshafts. Although highly durable, Cardan joints are typically not suited for applications with high angles (e.g. >2 degrees) because of their inability to accommodate constant velocity rotary motion. Constant Velocity joints, in contrast, are well known in the art and are employed where transmission of a constant velocity rotary motion is desired or required. For example, a tripod joint is characterized by a bell-shaped outer race (housing) disposed around an inner spider joint which travels in channels formed in the outer race. The spider-shaped cross section of the inner joint is descriptive of the three equispaced arms extending therefrom which travel in the tracks of the outer joint. Part spherical rollers are featured on each arm.

One type of constant velocity universal joint is the plunging tripod type, characterized by the performance of end motion in the joint. Plunging tripod joints are currently the most widely used inboard (transmission side) joint in front wheel drive vehicles, and particularly in the propeller shafts found in rear wheel drive, all-wheel drive and 4-wheel drive vehicles. A common feature of tripod universal joints is their plunging or end motion character. Plunging tripod universal joints allow the interconnection shafts to change length during operation without the use of splines which provoke significant reaction forces thereby resulting in a source of vibration and noise.

Another common type of constant velocity universal joint is the plunging VL or "cross groove" type, which consists of an outer and inner race drivably connected through balls located in circumferentially spaced straight or helical grooves alternately inclined relative to a rotational axis. The balls are positioned in a constant velocity plane by an intersecting groove relationship and maintained in this plane by a cage located between the two races. The joint permits axial movement since the cage is not positionably engaged to either race. As those skilled in the art will recognize, the principal advantage of this type of joint is its ability to transmit constant velocity and simultaneously accommodate axial motion. Plunging VL constant velocity universal joints are currently used for high speed applications such as, for example, the propeller shafts found in rear wheel drive, all-wheel drive and 4-wheel drive vehicles.

The high speed fixed joint (HSFJ) is another type of constant velocity joint well known in the art and used where transmission of high speed is required. High speed fixed joints allow articulation to an angle (no plunge) but can accommodate much higher angles than with a Cardan joint or other non-CV joints such as, for example, rubber couplings. There are generally three types of high speed fixed joints: (1) disk style that bolts to flanges; (2) monoblock style that is affixed to the tube as a center joint in multi-piece propshafts; and (3) plug-on monoblock that interfaces directly to the axle or T-case replacing the flange and bolts.

In a disc-style constant velocity fixed joint, the outer joint member is open on both ends and the cage is assembled from the end opposite the end towards which the cage is urged by the ball expulsion forces under articulated load conditions. Assembly of the cage into the outer joint member is typically accomplished by either incorporating cage assembly notches into one of or a pair of lands in the outer joint member, or by sufficiently increasing the bore diameter of the outer joint part to allow the ball cage to be introduced into the outer joint part.

In a mono-block constant velocity fixed joint, also called a "mono-block high speed fixed joint", the outer joint part is a bell-shaped member having a closed end. Accordingly, the cage must be assembled from the open end of the outer joint member. To accommodate assembly of the cage into the outer joint part, the bore diameter of the outer joint part must be sufficiently increased to allow assembly and/or assembly notches must be incorporated into at least one opposing pair of the outer joint member lands to allow introduction of the cage.

Driveline systems also commonly include one or more ball spline joints which include a plurality of balls enclosed within a cage to permit rotation around inner and outer respective races. Like constant velocity joints, ball spline joints are adapted to accommodate plunge in the axial direction, i.e. end wise movement. However, unlike constant velocity joints, ball spline joints do not permit articulation at an angle.

A typical driveline system incorporates one or more of the above joints in an all wheel drive or traditional four wheel drive system. In an all wheel drive system, such joints are used to connect a pair of propeller shafts (front and rear) (also called a propeller shaft assembly) to a power take off unit and a rear driveline module, respectively. These propeller shafts ("propshafts") function to transfer torque to the rear axle in rear wheel and all wheel drive vehicles. Similarly, in a traditional four wheel drive system, such joints are used to connect the propeller shaft between a transfer case and the front axle.

In certain applications, such as, for example, traditional four wheel drive systems, it is desirable to utilize a constant velocity joint/ball spline joint assembly. Many of these prior art applications have had problems in providing a sealing solution for these joint assemblies. Therefore, there is a need in the art to provide a sealing solution which accommodates both articulating and plunging convolutes and which further includes stabilizing features for high speed operation.

SUMMARY OF THE INVENTION

It is a principle object of the present invention to provide an improved joint assembly having a sealing solution which accommodates articulating and plunging convolutes with improved stabilizing features.

It is yet a further object of the present invention to provide a sealing system that is capable of segregating leaked grease from the joints to convolutes.

It is still a further object of the present invention to provide a combined boot for multiple joints.

It is a further object of the present invention to provide an improved boot for use in sealing a constant velocity and ball spline joint assembly.

In carrying out the above objects, there is provided an improved joint assembly including a fixed joint and a ball spline joint affixable to the fixed joint. The ball spline joint includes an inner race and an outer race. The assembly further includes a boot affixable to the fixed joint and the ball spline joint to seal and house the combined joints. In keeping with the invention, the boot includes a plurality of articulating convolutes, a grease catching member, and a first stabilizing member joining the plurality of articulating convolutes and the grease catching member. The first stabilizing member is adapted to ride above the inner race of the ball joint to provide stability at high speed. The boot further includes a plurality of plunging convolutes and a second stabilizing member joining the plurality of plunging convolutes and the grease catching member. In further keeping with the invention, the second stabilizing member is adapted to ride above the outer race of the ball spline joint to provide additional stability.

One advantage of the present invention is an improved sealing system for a combination just assembly.

Another advantage of the present invention is the use of stabilism features for the boot.

The assembly is specifically adapted for use in a propeller shaft wherein in a preferred embodiment, the articulating convolutes are adapted to accommodate joint articulation to an angle of at least 15 degrees and the plunging convolutes are adapted to accommodate joint plunge to at least 45 mm. In the preferred embodiment, the first stabilizing member is adapted to ride approximately 1 mm above the inner race of the ball spline joint. Similarly, the second stabilizing member is adapted to ride approximately 1 mm above the outer race of the ball spline joint. Of course, any suitable joint articulation, joint plunge and clearance above the inner and outer races may be used depending upon the application.

These and other objects features and advantages of the present invention will be more readily apparent with reference to the following detailed description of the drawings wherein like reference numerals correspond to like components.

BRIEF DESCRIPTION OF DRAWINGS

FIG. 9 is a perspective diagram of the improved boot of the present invention shown in FIG. 4.

BEST MODE FOR CARRYING OUT THE INVENTION

Figure 1:
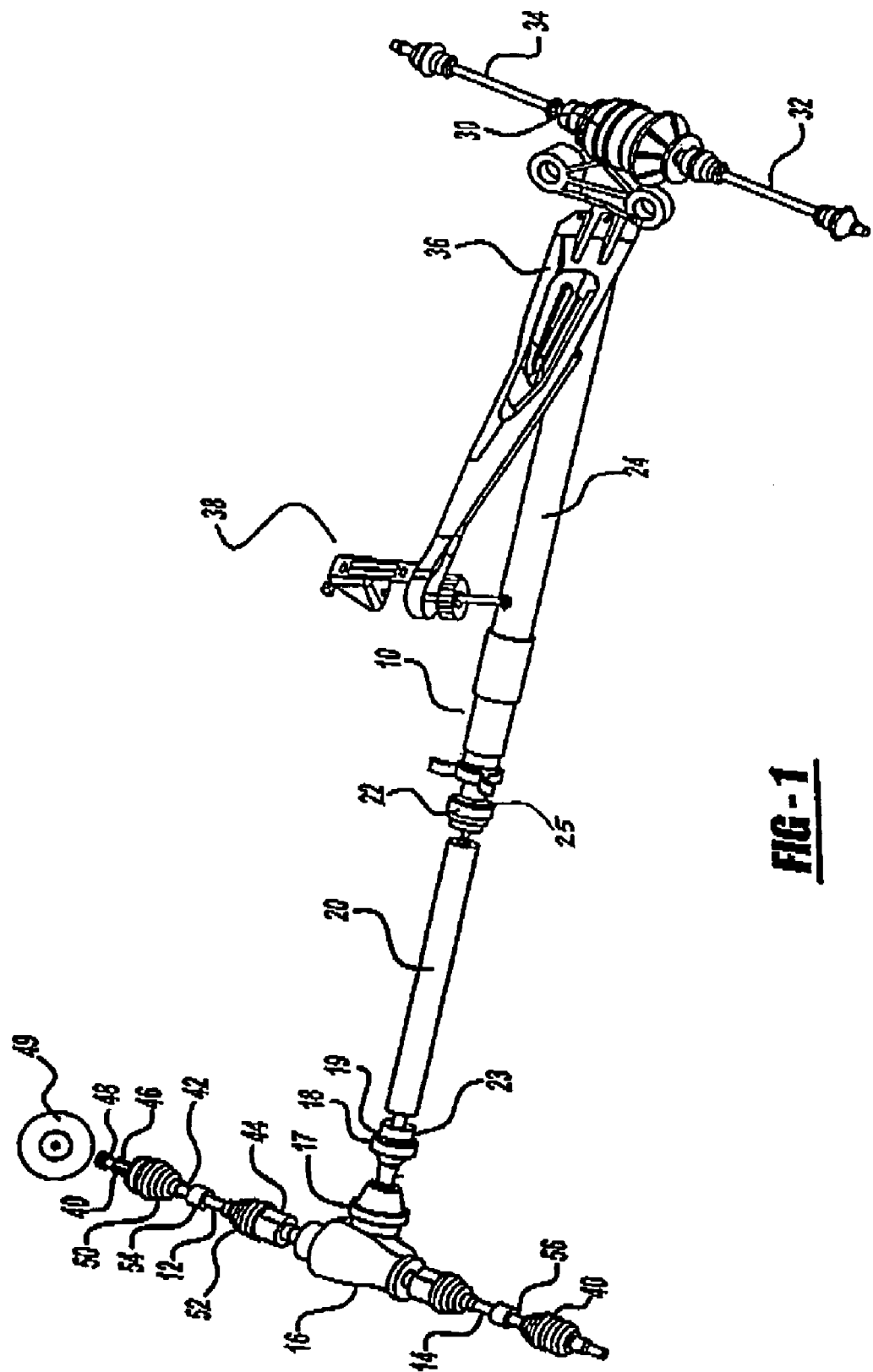
FIG. 1 is a prospective view of a representative all wheel drive system which may be adapted to receive the improved joint assembly of the present invention.
Figure 2:
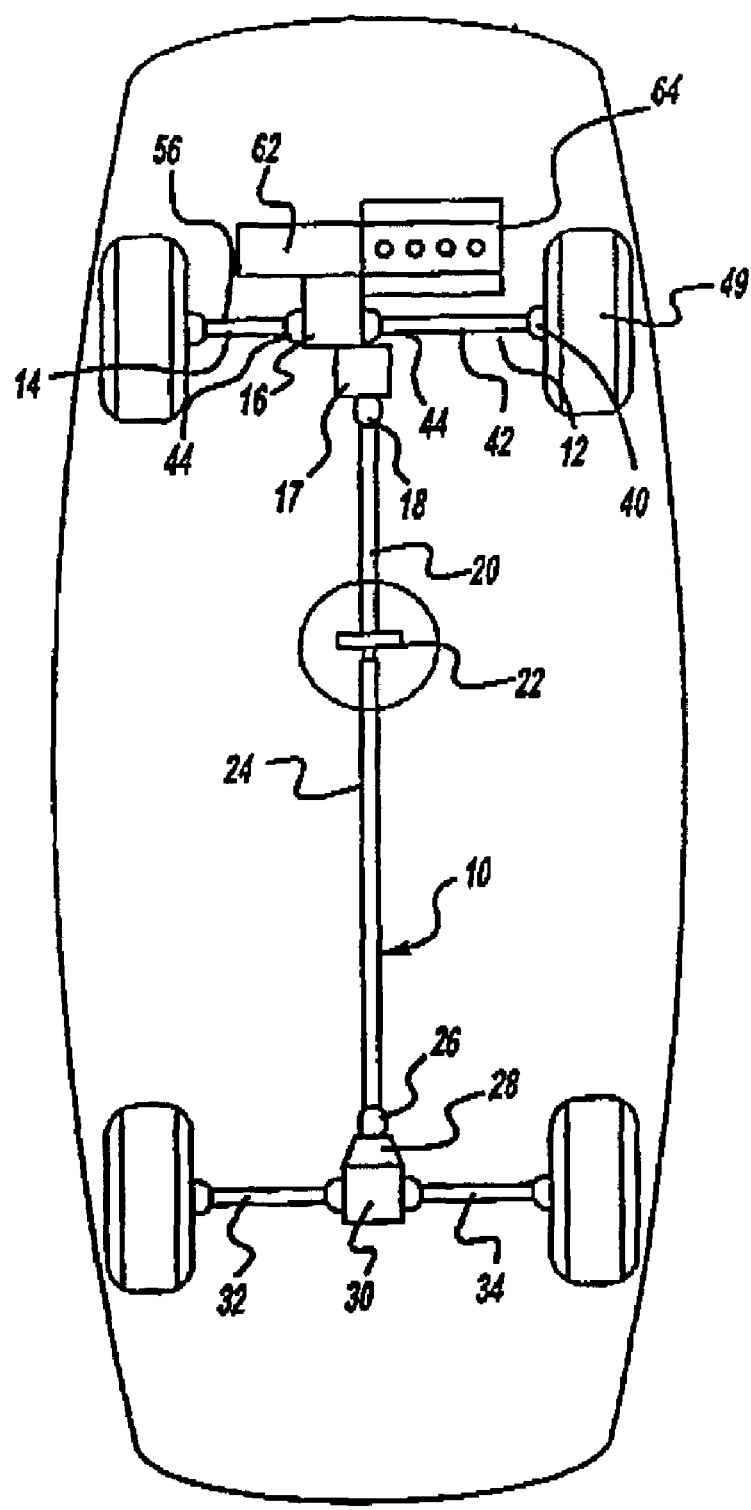
FIG. 2 is a diagrammatical depiction of the drive system of FIG. 1.

With reference to FIGS. 1-2 there is shown generally by reference numeral 10, a representative diagram of an all wheel drive system of a motor vehicle. Drive system 10 comprises a pair of front half shaft assemblies designated as reference numerals 12 & 14 respectively. The front half shaft assemblies 12 & 14 are operatively connected to a front differential 16. Connected to front differential 16 is a power take-off unit 17. The power take-off 17 is operatively connected to a high speed fixed joint 18. Operatively connected to high speed fixed joint 18 is a front propeller shaft ("propshaft") assembly 20. Operatively connected to front propshaft assembly 20 is a "VL" style plunging constant velocity joint designated as reference numeral 22. Connected to "VL" style plunging constant velocity joint 22 is rear propshaft assembly 24. Rear propshaft assembly 24 is connected on one end to Cardin joint assembly 26. Cardan joint assembly 26 may be operatively connected to a speed sensing torque device 28. Speed sensing torque transfer device 28 is operatively connected to a rear differential assembly 30. A pair of rear half shaft assemblies 32 & 34 are each connected to rear differential assembly 30. As shown in FIG. 1, attached to the rear differential assembly 30 is torque arm 36. Torque arm 36 is further connected to torque arm mount 38.

Front half shaft assemblies 12 & 14 are comprised of fixed constant velocity joints 40, an interconnecting shaft 42 and a plunge style constant velocity joint 44. Plunge style constant velocity joints 44 are operatively connected to the front differential 16. Plunge style constant velocity joints 44 are plug-in style in this embodiment. However, any style of constant velocity joint, half shaft assembly may be used depending upon the application. As shown in FIG. 1, the stem portion 46 is splined such that it interacts with a front wheel of a motor vehicle and has a threaded portion 48 which allows connection of the wheel 49 to the half shaft assembly 12.

There is also shown in FIG. 1 constant velocity joint boots 50 & 52 which are known in the art and are utilized to contain constant velocity joint grease which is utilized to lubricate the constant velocity joints. There is also shown a dynamic damper 54 which is known in the art. U.S. Pat. No. 5,660,256 to the Assignee of the present invention is herein incorporated by reference.

Halfshaft assembly 14 may be designed generally similar to that of halfshaft assembly 12 with changes being made to the length of interconnecting shaft 56. Different sizes and types of constant velocity joints may also be utilized on the left or right side of the drive system depending on the particular application.

The power take-off unit 17 is mounted to the face of the transmission 62 and receives torque from the front differential 16. The transmission 62 is operatively connected to the engine 64 of the motor vehicle. The power take-off unit 17 has the same gear ratio as the rear differential 30 and drives the front propshaft 20 through the high speed fixed joint 18 at 90 degrees from the front differential axis.

A high speed fixed joint 18 is connected at one end to the power take-off unit 17 and at the other end to a front propshaft 20. "VL type" plunging constant velocity joint 22 is similarly connected at one end to the rear propshaft 24 and at the other end to front propshaft 20. The high speed fixed joint may have a revolution-per-minute (RPM) capacity of 6000 RPMs with a preferable range of 3000-5000 RPMs, a torque capacity of 5-1500 Nm with a preferable capacity of 600-700 Nm, and an angle capacity of up to 15 degrees with a preferable capacity of 3-6 degrees. Of course, the drive system may use other constant velocity joints and/or Cardin joints or universal joint technology at this connection. However, a high speed fixed joint is preferred.

High-speed fixed joint 18 includes a boot 23, which is utilized to enclose grease (not shown) required for lubrication of the high-speed fixed joint 18. The front propshaft 20 in the present invention is manufactured from steel providing a very low run-out and critical speed capacity higher than the second engine order. Front propshaft 20 is operatively connected to constant velocity joint 22 by fasteners 25. Front propshaft 20 has a flange (not shown) extending out which is connected to constant velocity joint 22 by fasteners 25. High-speed fixed joint 18 similarly includes a flange 19 extending out that is connected to front propshaft 20 by fasteners.

Figure 3:
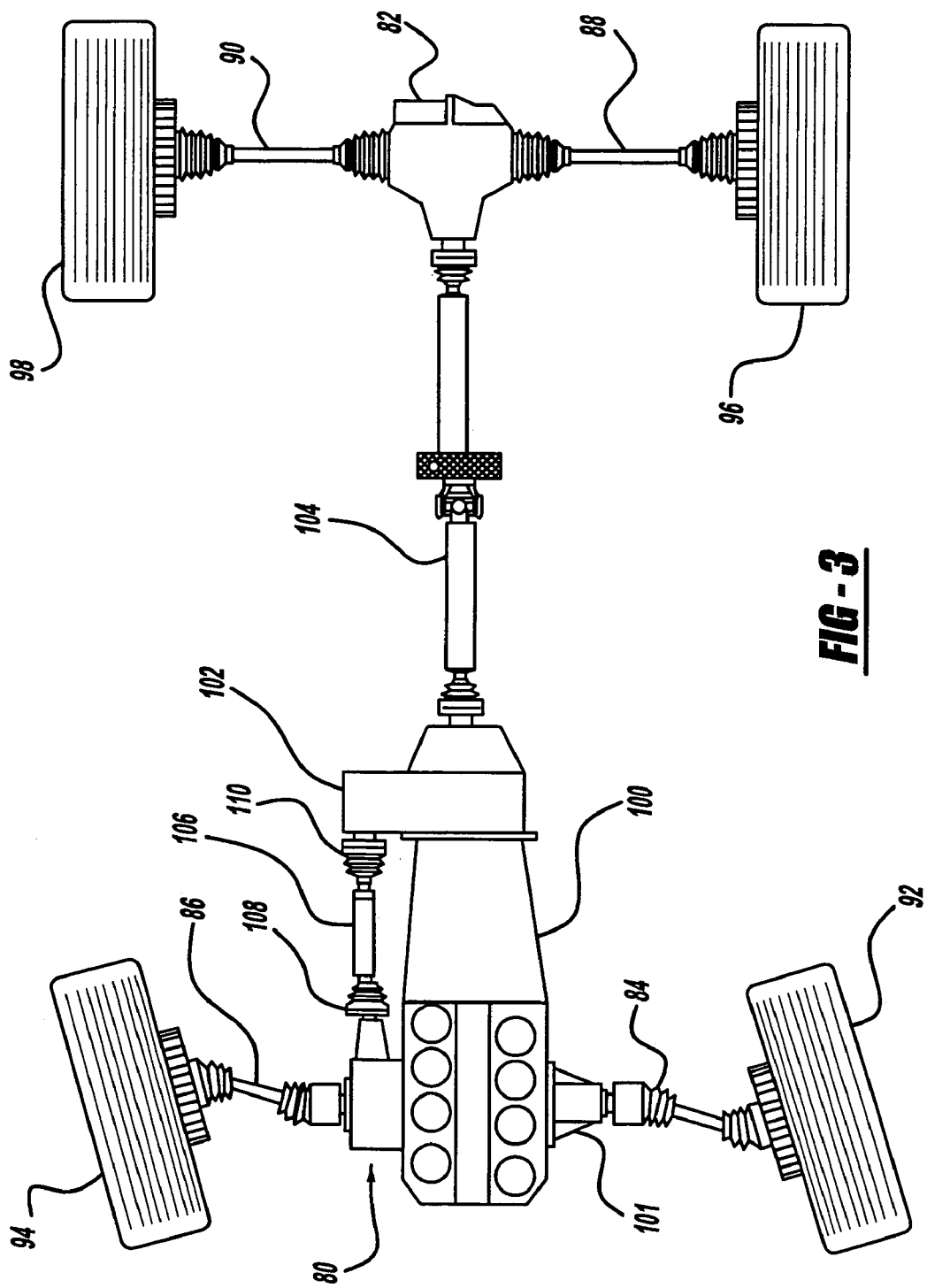
FIG. 3 is a diagrammatical view of a traditional 4-wheel drive system adapted to receive the improved joint assembly of the present invention.

A representative diagram of a traditional four wheel drive system is provided in FIG. 3. As shown, the front and rear axles, 80, and 82, each comprise respective half shaft assemblies 84, 86, 88, and 90, which are affixable to driven wheels 92, 94, 96, and 98. Front half shaft assemblies 84 and 86 are further affixable to a combustion engine/transmission assembly 100 via a bearing support assembly 101. Engine/transmission assembly 100 is further affixable to a transfer case 102 which, in turn, is affixable to a rear propeller shaft 104. Finally, a front propshaft 106 is affixable between transfer case 102 and the front axle 80. As in the case of a front propeller shaft assembly in an all wheel drive system, the front propshaft 106 used in a traditional four wheel drive system also includes a high speed fixed joint 108 and a VL plunging joint 110 affixable at respective ends of the propshaft.

As indicated above, in certain situations, it is desirable to provide a constant velocity joint/ball spline joint combination for prop shaft applications. Such applications may include the above all-wheel drive and/or traditional 4-wheel drive systems. In the case of a traditional 4-wheel drive system, for example, a high speed fixed joint/ball spline combination may be utilized between the vehicle transfer case and the front axle. Such a joint combination is shown, for example, in FIG. 4 and designated generally by reference numeral 200. As indicated above, a high speed fixed joint 212 allows only articulation to an angle (no plunge) but can accommodate much higher angles than with a Cardin joint. Many varieties of high speed fixed joints exist including, for example, the above referenced disc style that bolts to flanges, mono-block style that is welded to a tube as a center joint in multi piece propshafts, and plug-on mono-blocks that interface directly to an axle or transfer case replacing the flange and bolts. A typical high speed fixed joint 212 is illustrated in FIG. 5 and designated generally by reference numeral 212. High speed fixed joint 212 includes an inner joint part to 214 having corresponding inner races 216, an outer joint part 218 having outer races to 219, and a ball cage 220 for containing a plurality of balls 222.

Figure 4:
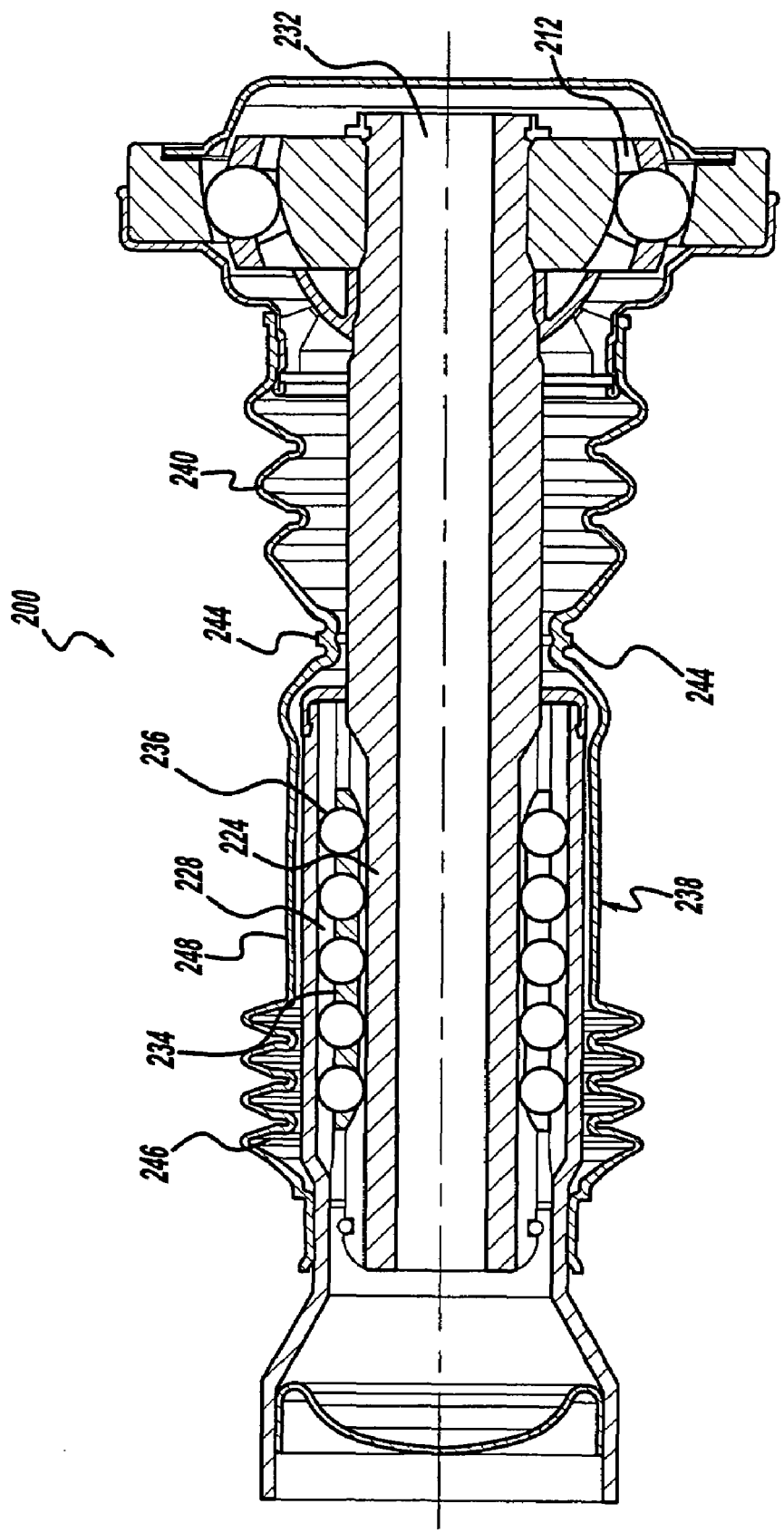
FIG. 4 is a cross-sectional diagram of the improved joint assembly of the present invention.
Figure 5:
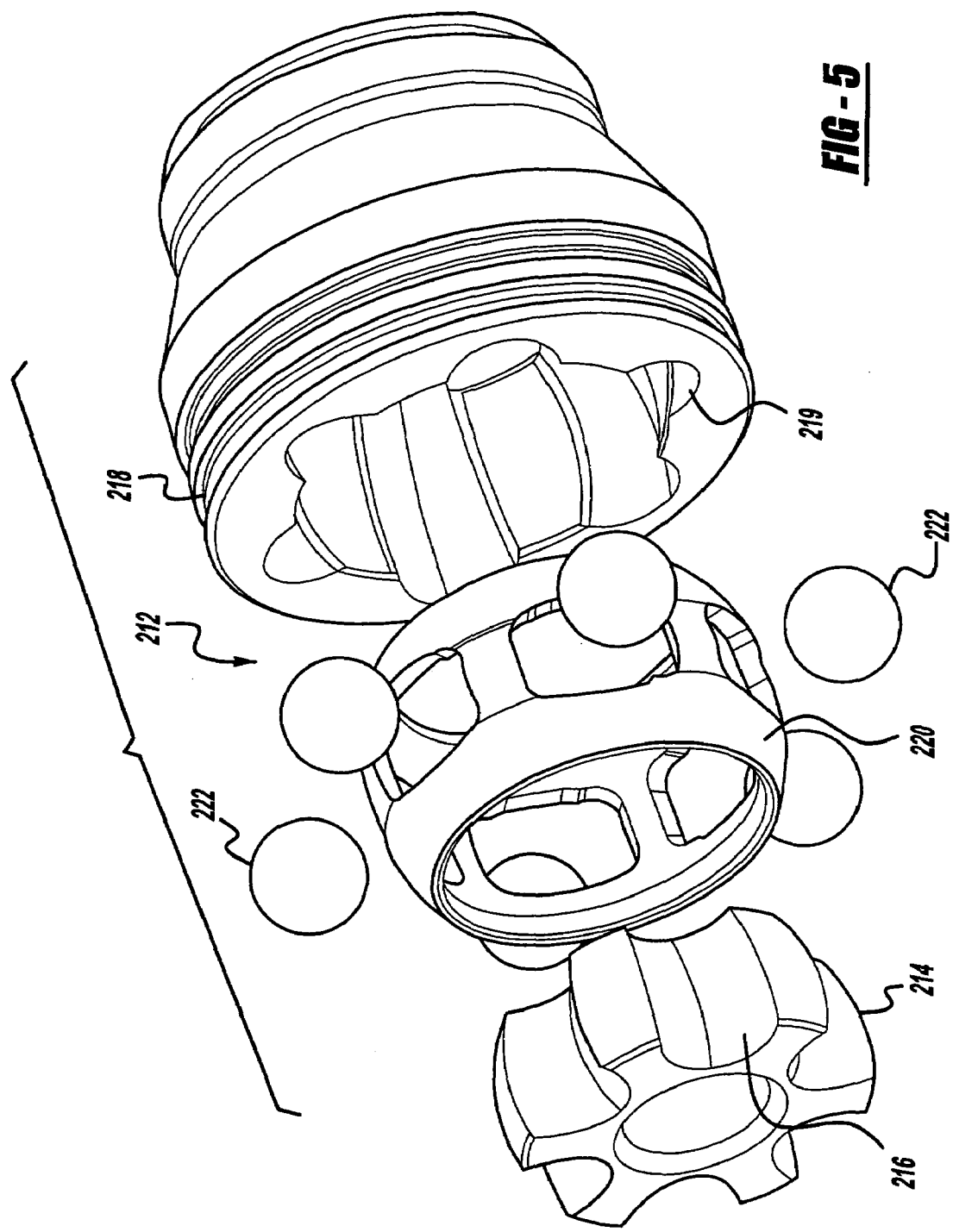
FIG. 5 is an exploded perspective diagram of the constant velocity joint shown in FIG. 4.
Figure 6:
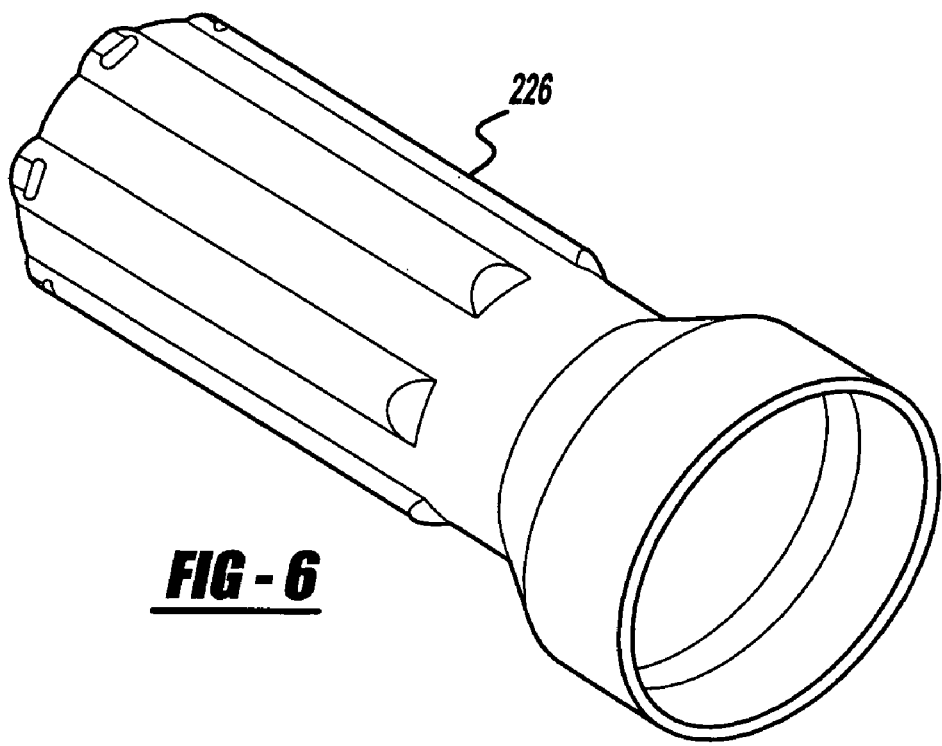
FIGS. 6-8 are perspective diagrams of the outer race, inner race and ball cage of the ball spline joint shown in FIG. 4.
Figure 7:
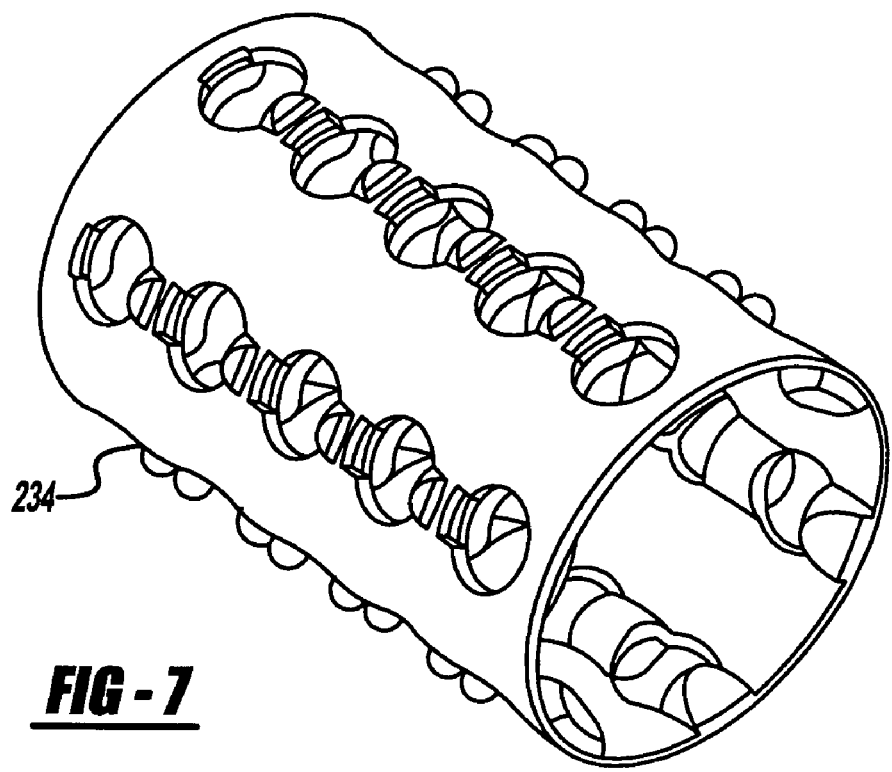
Figure 8:
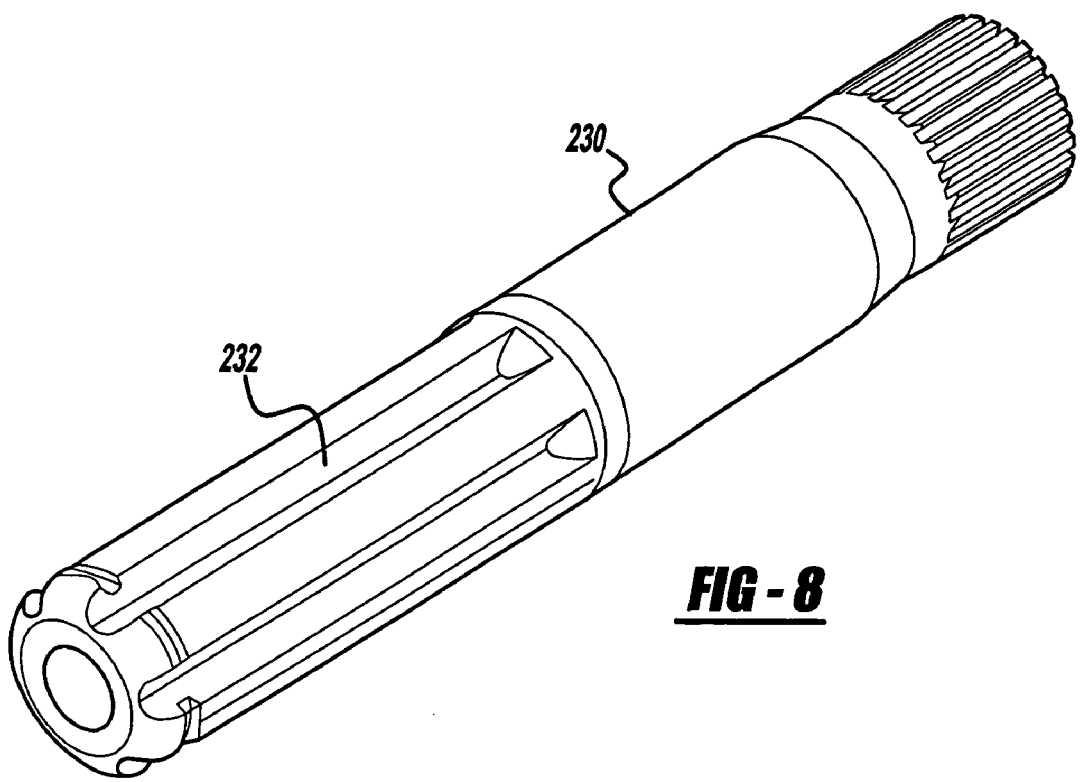
Figure 11:
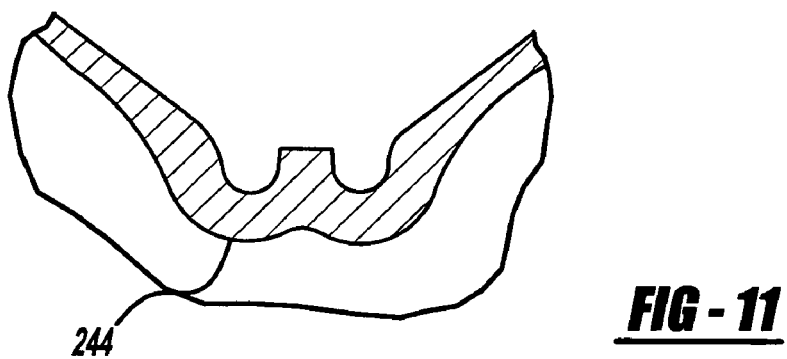
FIG. 11 is a magnified cross-sectional diagram of Section E of FIG. 10.
Figure 10:
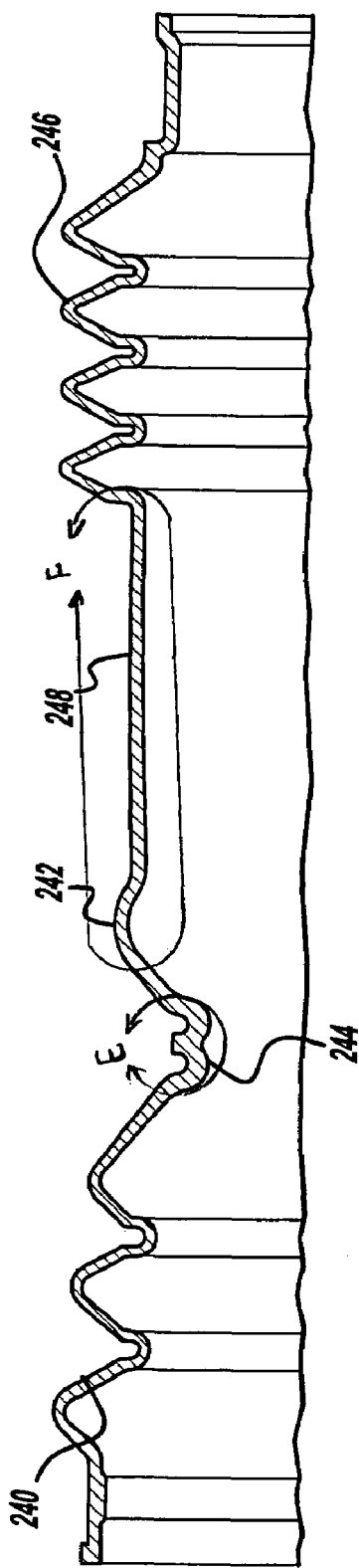
FIG. 10 is a cross-sectional diagram of the improved boot of the present invention.
Figure 12:
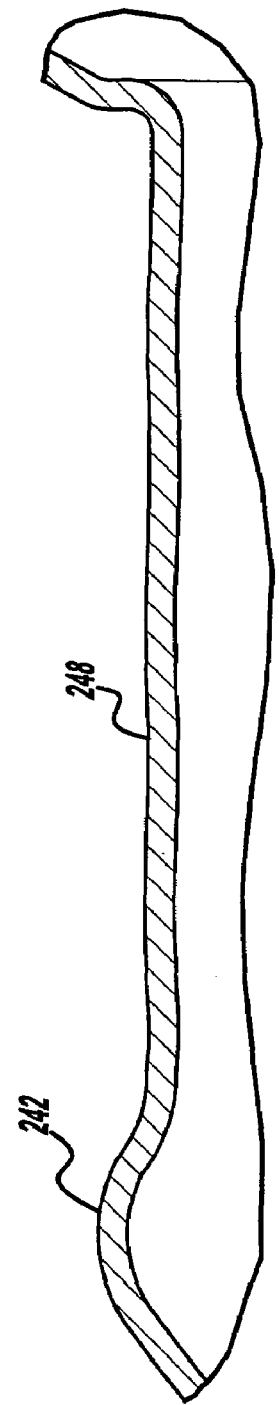
FIG. 12 is a magnified cross-sectional diagram of the detail of Section F of FIG. 10.

As shown in FIG. 4, high speed fixed joint 212 is affixable to a ball spline joint 224. Again, those skilled in the art are familiar with the operation of a ball spline joint and, therefore, such operation need not be discussed in detail. By way of overview, however, FIGS. 4-8, respectively illustrate the ball spline outer joint part 226 having outer races 228, inner joint part 230 having inner races 232 and ball cage 234 for containing a plurality of balls 236. The use of the combination type joint will reduce noise transmission in propshaft applications.

In keeping with the invention, the improved joint assembly includes a sealing solution which provides both articulating and plunging convolutes with additional stabilizing features. Specifically, assembly 200 comprises a boot 238 for sealing and stabilizing the entire joint assembly 200. Boot 238 includes a plurality of articulating convolutes 240, a grease catching member 242 and a first stabilizing member 244 which functions to join the plurality of articulating convolutes 240 and the grease catching member 242. As shown, stabilizing member 244 is adapted to ride a sufficient distance above inner race 232 of ball spline joint 200 to provide stability at high speed. Boot 238 further includes a plurality of plunging convolutes 246 as well as a second stabilizing member 248 joining the plurality of plunging convolutes 246 and the grease catching member 242. The second stabilizing member 248 is similarly adapted to ride a sufficient distance above outer race 228 of ball spline joint 200 to provide additional stability. The second stabilizing member 248 may have a cylindrical like shape with at least one rib or wave along a cylindrical length thereof. The second stabilizing member 248 may have a substantially constant wall thickness.

In the preferred embodiment, the articulating convolutes 240 of boot 238 are adapted to accommodate joint articulation to an angle of at least 15 degrees. Similarly, plunging convolutes 246 of boot 238 are adapted to accommodate joint plunge to at least 45 mm. Stabilizing members 244 and 248 are further adapted to ride approximately 1 mm above the respective inner and outer races 232 and 228 of ball spline joint 200. Boot 238, is preferably, but not necessarily, comprised of a thermal plastic material or other suitable composition and, in a preferred embodiment, is intended to accommodate vehicle installation at an angle of at least 15 degrees as well as joint operation of at least 7 degrees and 9,000 revolutions per minute. Still further, boot 238, in a preferred embodiment, is adapted to accommodate crash plunge of at least 30 mm extension and 15 mm compression. Finally, in the preferred embodiment, boot 238 is adapted to accommodate joint plunge of at least 45 mm extension and 45 mm compression.

As shown, in the preferred embodiment, boot 238 is a single piece component with the various sections contiguous with one another. However, any suitable composition/subcomponents may be utilized provided that the intended functions are carried out. The boot 238 will have better NVH performance characteristics than the combination joints of the prior art.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An improved joint assembly, comprising:
a constant velocity joint having a constant velocity inner race and a constant velocity outer race, wherein at least one of;
a ball spline joint selectively affixed to the constant velocity joint, the ball spline joint having an inner race and an outer race; and
a boot affixable to the constant velocity joint and the ball spline joint to seal and house the combined joints, the boot comprising:
a plurality of articulating convolutes;
a grease catching member;
a first stabilizing member joining the plurality of articulating convolutes and the grease catching member, the first stabilizing member adapted to ride above the inner race of the ball spline joint to provide stability at high speed;
a plurality of plunging convolutes;
a second stabilizing member joining the plurality of plunging convolutes and the grease catching member, the second stabilizing member having a substantially constant wall thickness and adapted to circumscribe the outer race of the ball spline joint at a generally predetermined distance to provide additional stability.

2. An improved joint assembly as in claim 1, wherein the boot is comprised of a thermoplastic material.

3. An improved joint assembly as in claim 1, wherein the constant velocity joint is a high speed fixed joint.

4. An improved joint assembly as in claim 1, wherein the assembly is adapted for use in a propshaft.

5. An improved joint assembly as in claim 1, wherein the articulating convolutes are adapted to accommodate joint articulation to an angle of at least 15 degrees.

6. An improved joint assembly as in claim 1, wherein the plunging convolutes are adapted to accommodate joint plunge to an angle of at least 45 mm.

7. An improved joint assembly as in claim 1, wherein the first stabilizing member is adapted to ride approximately 1 mm above the inner race of the ball spline joint.

8. An improved joint assembly as in claim 1, wherein the second stabilizing member is adapted to ride approximately 1 mm above the outer race of the ball spline joint.

9. An improved joint assembly as in claim 1, wherein the boot is adapted to accommodate vehicle installation at an angle of at least 15 degrees.

10. An improved joint assembly as in claim 1, wherein the boot is adapted to accommodate joint operation of at least 7 degrees and 9000 revolutions per minute.

11. An improved joint assembly as in claim 1, wherein the boot is adapted to accommodate crash plunge of at least 30 mm extension and 15 mm compression.

12. An improved joint assembly as in claim 1, wherein the boot is adapted to accommodate joint plunge of at least 15 mm extension and 15 mm compression.

13. An improved joint assembly as in claim 1, further comprising a shaft portion interconnecting at least one of the constant velocity inner race and the constant velocity outer race with at least one of the outer race and the inner race of the ball spline joint.

* * * * *